United States Patent [19]
Arnett et al.

[11] 3,730,216
[45] May 1, 1973

[54] FUEL TANK INSERT FOR ADMITTING PRESELECTED PUMP NOZZLES

[75] Inventors: Lawrence E. Arnett, Wayne; Paul J. Billock, Westland, both of Mich.

[73] Assignee: Ford Motor Company, Dearborn, Mich.

[22] Filed: Apr. 6, 1972

[21] Appl. No.: 241,621

[52] U.S. Cl............137/588, 251/149.2, 220/86 R
[51] Int. Cl................................................F16k 45/00
[58] Field of Search.........................251/144.2, 339; 137/351, 592, 588; 220/35, 36, 86 R, 86 AT; 141/348, 349, 350, 331, 335, 344

[56] References Cited

UNITED STATES PATENTS

| | | |
|---|---|---|
| 2,033,432 | 3/1936 | Leach....................220/86 R |
| 2,035,895 | 3/1936 | Kelly.....................220/86 R |
| 3,545,363 | 12/1970 | Bricher..................251/339 X |
| 3,580,414 | 5/1971 | Ginsburgh et al. .........251/149.2 X |

*Primary Examiner*—William R. Cline
*Attorney*—Keith L. Zerschling et al.

[57] ABSTRACT

An insert to be positioned within the fuel tank inlet pipe of an automotive vehicle to prevent filling the tank with improper fuels. The insert would permit entry of and delivery from a pump nozzle spout of a predetermined diameter of less, to be used with non-leaded fuels and would preclude entry of and delivery from a larger diameter pump nozzle spout, to be used with leaded fuels. The insert includes a hinged gage having a latch which can be tripped by the smaller diameter nozzle but not by the larger diameter nozzle.

7 Claims, 6 Drawing Figures

Patented May 1, 1973
3,730,216
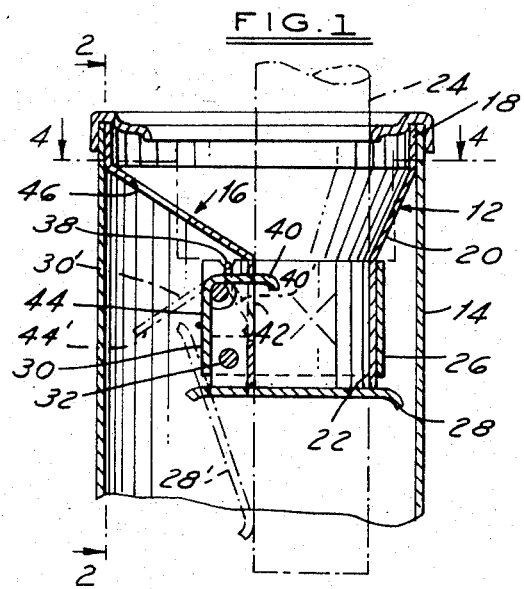
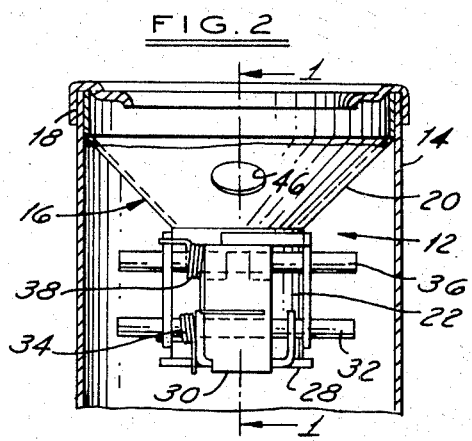
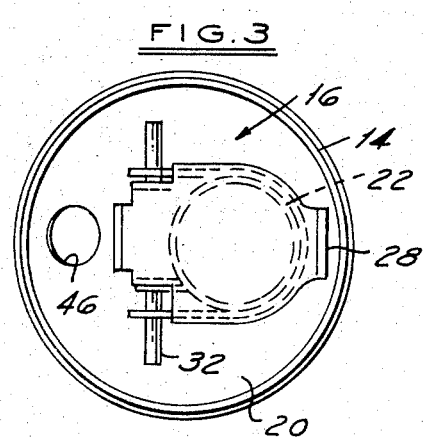
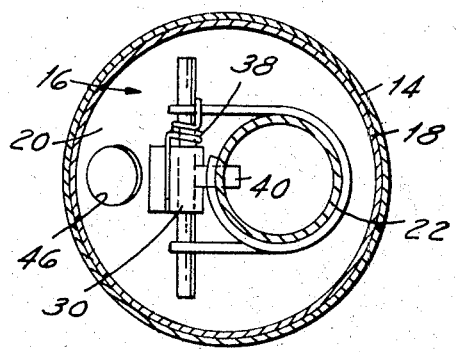
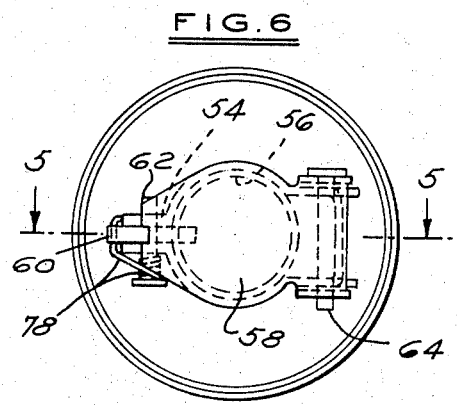
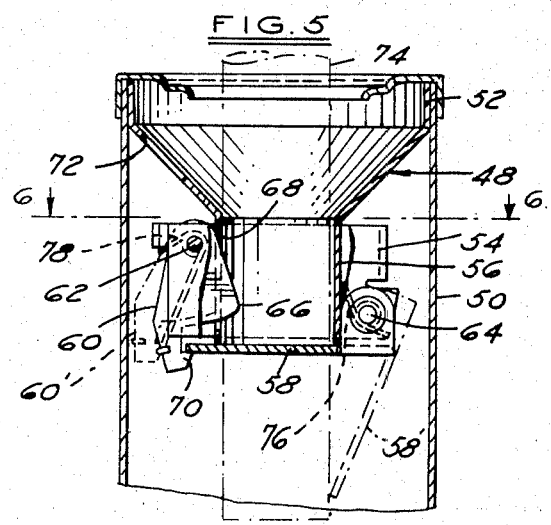

(3,730,216)

FUEL TANK INSERT FOR ADMITTING PRESELECTED PUMP NOZZLES

BACKGROUND AND SUMMARY OF THE INVENTION

When catalytic converters or mufflers are used to treat the exhaust gases of internal combustion engines, means to prevent refueling with leaded fuels are desirable. Use of leaded fuels would permanently reduce or eliminate the effectiveness of the catalyst.

It has been proposed that automobile service station pumps for non-leaded fuels have smaller diameter nozzle spouts and pumps for leaded fuels have larger diameter spouts. This invention provides an insert positionable within the inlet or filler pipe of the fuel tank of an automobile which accepts the smaller diameter nozzle spout but which does not accept the larger diameter spout. Also, this invention provides an insert which cooperates with the automatic shut-off mechanism of a fuel pump nozzle to prevent entry of significant quantities of leaded fuel delivered through nozzle spouts of the larger diameter. Further, this invention provides means to discourage and prevent the intentional filling of a fuel tank with leaded fuel delivered through a larger diameter nozzle spout. Invention also provides a construction which is economical to produce and install and which is reliable and effective in operation.

An insert assembly constructed in accordance with this invention includes a first member fixed within an inlet having an opening or entrance formed therein constructed to receive nozzle spouts of a predetermined dimension or less and to prevent reception of nozzle spouts having dimensions greater than the predetermined dimension. A gate is positioned downstream of the opening and opens and closes to control flow through the opening. The gate is pivotally supported relative to the first member at a position spaced downstream from the opening. A latch means locks the gate in a closed position and includes a portion located downstream of the opening and upstream of the gate that is displaceable by a nozzle spout of the predetermined dimension or less being inserted through the opening. Spring means bias the gate means toward a closed position and the latch means toward a locked position.

BRIEF DESCRIPTION OF THE DRAWINGS

FIG. 1 is a cross-sectional view through line 1—1 of FIG. 2 viewed in a direction perpendicular to the axis of the inlet pipe of an insert assembly constructed in accordance with this invention.

FIG. 2 is an elevational view of the insert taken in the direction of arrow 2 in FIG. 1.

FIG. 3 is an elevational view of the insert taken in the direction of arrow 3 in FIG. 1.

FIG. 4 is a cross-sectional view taken along line 4—4 of FIG. 1.

FIG. 5 is a cross-sectional view, similar to FIG. 1, of an alternate embodiment of the invention.

FIG. 6 is a cross-sectional view taken along line 6—6 of FIG. 5.

DETAILED DESCRIPTION OF A PREFERRED EMBODIMENT

FIGS. 1 through 4 of the drawings illustrate an insert assembly 12 mounted within an inlet pipe 14 of an automobile fuel tank (not shown). The insert assembly includes a funnel member 16 having a rim portion 18 preferably welded to pipe 14, a tapered or conical portion 20 and a spout or a tube 22. The diameter of the upstream opening or entrance to the spout or tube 22 is critical in that it determines what size nozzle spouts 24 will be accepted within the tube 22 and which spouts will not be accepted. A U-shaped bracket 26 is secured to the tube and provides support for a gate or door 28 and a latch 30. The gate is pivotally mounted to the bracket by a pin 32 and is biased toward a normally closed position against the end of the funnel tube 22 by a coil spring 34. The latch is pivotally mounted to the bracket upstream of the gate by pin 36 and is biased toward a normally locking position by spring 38. The latch includes a first finger 40 which normally extends radially inwardly through a slot 42 formed in the spout or tube 22 between the entrance to the tube and the gate. A second finger 44 extends downwardly toward the gate and abuts with or engages a portion of the gate to prevent its opening if a force is applied to the gate without displacing the latch. A vent 46 is provided in the upper portion of the tapered part of the funnel which permits the escape of vapors and air from the tank when a nozzle spout is reserved within the tube 22.

When a nozzle spout 24 of a diameter slightly less than the diameter of the opening of tube 22 is received within the tube, it engages the finger 40 of the latch 30 and displaces it to the position as shown in phantom lines referred by numeral 30'. This unlocks the gate 28 enabling it to be displaced to the position referred to by numeral 28' and permits the full insertion of the fuel pump nozzle spout as shown in FIG. 1. If a nozzle spout of an outer diameter larger than the diameter of the opening of tube 22 is attempted to be used in delivering fuel, the closed door 28 causes the fuel to rise in the funnel spout or tube 22 and to bubble back into the pump nozzle spout 24 causing its automatic shut-off device to terminate the flow. Thus, it can be seen that accidental delivery of fuel from a larger diameter, leaded fuel pump nozzle spout is prevented and intentional delivery of fuel is made exceptionally difficult.

DETAILED DESCRIPTION OF AN ALTERNATE EMBODIMENT

FIGS. 5 and 6 of the drawings show an alternately constructed insert assembly 47 which is functionally similar to the preferred embodiment. A funnel 48 is secured at its upper rim portion 52 within a fuel tank inlet pipe 50. A bracket 54 clamps about the discharge tube or spout 56 of the funnel and pivotally attaches a gate or door 58 and a latch 60. The gate is pivotal about pin 64 and is biased toward a closed position by spring 78. The latch is pivotal about pin 62 and is biased toward locking engagement with gate 58 by spring 76.

The latch 60 includes a portion 66 which normally extends through a slot 68 in the discharge tube 56 of the funnel. The latch further includes a catch 70 which snaps under an edge of the gate 58 and retains the gate in a locked position until the latch is displaced. The catch is positioned relative to the pivot axis of the latch means and the pivot axis of the gate so that an opening force exerted by the gate against the catch 70 imparts a moment to the latch 60 tending to increase the closing pressure of the latch. As viewed in FIG. 5, such a moment of force would exist if the catch 70 is positioned leftwardly of a vertical line drawn through the axis of pin 62.

A vent 72 permits the escape of air and vapor from the fuel tank when a nozzle spout 74 is received within the tube or spout 56 of the insert assembly 47.

When a nozzle spout 74 of a diameter slightly less than that of the opening or entrance to tube 56 is inserted into the tube, it displaces the latch 60 clockwise to the position shown by phantom lines in FIG. 5 referred to by numeral 60′ which unlocks gate 58. Further insertion of the pump nozzle spout 74 displaces the door to the position shown in phantom referred to by reference numeral 58′. If fuel delivery is attempted through a nozzle spout having a diameter greater than the opening to the tube 22, the spout will not be received within the discharge tube, the latch 60 will not be displaced and the door 58 will remain closed. Fuel will bubble back and the automatic shut-off device in the fuel pump nozzle spout will cause the flow of fuel to be terminated.

It should be noted that the invention also provides apparatus which is applicable for use with inlets of storage containers other than automobile fuel tanks where the filling of the container or the discharge into the inlet could cause undesirable or harmful effects.

Modifications and alterations will occur to those skilled in the art which are included within the scope of this invention as defined by the following claims.

We claim:

1. Means to prevent the filling of a container with a liquid delivered from a nozzle spout having a dimension greater than a predetermined magnitude and to permit the filling of the container with a liquid delivered from a nozzle spout having a dimension equal to or less than the predetermined magnitude, said means comprising a member positioned within the inlet of said container having an opening formed therein constructed to accept a nozzle spout of a dimension of said predetermined magnitude or less and to reject a nozzle spout of a dimension greater than said predetermined magnitude, gate means positioned within the inlet downstream of said opening, said gate means being movable relative to said member to permit and preclude flow of liquid through said opening, latch means positively retaining said gate means in a closed position, said latch means including a portion downstream of said opening and upstream of said gate means engageable with and displaceable by a nozzle spout of a dimension of said predetermined magnitude or less received within said opening.

2. Means according to claim 1,
resilient means biasing said gate means toward a normal, latched position.

3. Means according to claim 1,
first means supporting said gate means to pivot about a first axis,
second means supporting said latch means to pivot about a second axis,
said latch means including a catch which engages an edge of said gate means when said gate is closed, said catch being positioned relative to said first and second axes so that an opening force from said gate to said catch imparts a moment on said latch more firmly against said gate.

4. A tank inlet pipe insert assembly constructed to selectively accept and reject pump nozzle spouts on the basis of outer diameter magnitude, said insert assembly comprising:

a funnel-shaped member secured within the inlet pipe including a funnel spout having an entrance opening having a predetermined cross-sectional dimension, gate means pivotally mounted to said funnel spout and engageable with the downstream end of said spout to prevent flow therethrough, latch means engageable with said gate means to lock said gate means in a closed position, said latch means including a portion extending into the interior of said funnel spout being displaceable by a pump nozzle spout introduced into said funnel spout to release said gate means and permit the pump nozzle spout to be further introduced and to open the gate means, spring means biasing said gate means toward a closed, locked position.

5. A tank inlet pipe insert assembly according to claim 4,
vent means formed in said funnel-shaped member permitting escape of vapor and air from the tank when a pump nozzle spout is received within said tube.

6. A tank inlet pipe insert assembly according to claim 4,
second spring means biasing said latch means toward a locked position.

7. A tank inlet pipe insert assembly according to claim 4,
said latch means being pivotally mounted relative to said tube, said latch means including a catch engageable with an edge of said gate means,
the catch being positioned relative to the pivot axes of said latch and said gate so that an opening force on said gate imparts a moment to said latch means tending to displace said latch means about its pivot axis in the direction of locking engagement with said gate means.

* * * * *